(12) United States Patent
Bober et al.

(10) Patent No.: US 7,940,987 B2
(45) Date of Patent: May 10, 2011

(54) METHOD AND APPARATUS FOR REPRESENTING AND SEARCHING FOR AN OBJECT IN AN IMAGE

(75) Inventors: Miroslaw Bober, Guildford (GB); James Cooper, Dorking (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/792,205

(22) Filed: Jun. 2, 2010

(65) Prior Publication Data

US 2010/0239175 A1 Sep. 23, 2010

Related U.S. Application Data

(62) Division of application No. 12/062,377, filed on Apr. 3, 2008, now Pat. No. 7,756,339, which is a division of application No. 11/777,135, filed on Jul. 12, 2007, now Pat. No. 7,388,986, which is a division of application No. 10/220,636, filed as application No. PCT/GB01/03044 on Jul. 6, 2001, now Pat. No. 7,269,285.

(30) Foreign Application Priority Data

Jul. 7, 2000 (GB) .................................. 0016809.6

(51) Int. Cl.
*G06K 9/46* (2006.01)
*G06T 15/10* (2011.01)

(52) U.S. Cl. .......................... 382/190; 382/203; 345/427

(58) Field of Classification Search .................. 382/190, 382/199, 201, 203, 305, 316; 707/1–10, 707/100, 102, 104.1; 345/420, 427
See application file for complete search history.

(56) References Cited

U.S. PATENT DOCUMENTS

| | | | |
|---|---|---|---|
| 4,270,229 | A | 6/1981 | Lipschutz |
| 4,584,704 | A | 4/1986 | Ferren |
| 5,465,353 | A | 11/1995 | Hull et al. |
| 5,710,877 | A | 1/1998 | Marimont et al. |
| 5,809,505 | A | 9/1998 | Lo et al. |
| 5,907,846 | A | 5/1999 | Berner et al. |
| 6,006,214 | A | 12/1999 | Carey et al. |
| 6,026,179 | A | 2/2000 | Brett |

(Continued)

FOREIGN PATENT DOCUMENTS

GB 2 349 493 A 11/2000

(Continued)

OTHER PUBLICATIONS

Abbasti et al., Proceedings of the Seventh IEEE International Conference on Computer Vision, vol. 1, pp. 450-455 (1999).

(Continued)

*Primary Examiner* — Sheela C Chawan
(74) *Attorney, Agent, or Firm* — Birch, Stewart, Kolasch & Birch, LLP.

(57) ABSTRACT

A method representing an object appearing in still or video image for use in searching, wherein the object appears in the image with a first two-dimensional outline, by processing signals corresponding to the image, comprises deriving a view descriptor of the first outline of the object and deriving at least one additional view descriptor of the outline of the object in a different view, and associating the two or more view descriptors to form an object descriptor.

1 Claim, 5 Drawing Sheets

U.S. PATENT DOCUMENTS

| | | | |
|---|---|---|---|
| 6,038,074 A | 3/2000 | Kitaguchi et al. | |
| 6,167,142 A | 12/2000 | Nozaki | |
| 6,205,231 B1 | 3/2001 | Isadore-Barreca et al. | |
| 6,226,637 B1 | 5/2001 | Carey et al. | |
| 6,249,600 B1 | 6/2001 | Reed et al. | |
| 6,442,538 B1 | 8/2002 | Nojima et al. | |
| 6,496,598 B1 | 12/2002 | Harman | |
| 6,819,797 B1 | 11/2004 | Smith et al. | |
| 6,931,154 B1 | 8/2005 | Bober | |
| 7,269,285 B2 | 9/2007 | Bober et al. | |
| 7,388,986 B2 | 6/2008 | Bober et al. | |
| 7,756,339 B2 * | 7/2010 | Bober et al. | 382/190 |

FOREIGN PATENT DOCUMENTS

| | | |
|---|---|---|
| JP | 64-023379 A | 1/1989 |
| JP | 11-338876 A | 12/1999 |
| WO | WO 00/67151 A1 | 11/2000 |

OTHER PUBLICATIONS

F. Mokhtarian et al., "Robust and Efficient Shape Indexing Through Curvature Scale Space", Proc. British Machine Vision Conference, pp. 53-62, Edinburgh, UK 1996.

Gevers, et al., "Content-based image retrieval by viewpoint-invariant color indexing", Image and Vision Computing 17 (1999), pp. 475-488.

Kuhl et al., Computer Vision Graphics and Image Processing, vol. 27, No. 1, pp. 97-114 (1984).

Sclaroff, Pattern Recognition, vol. 30, No. 4, pp. 627-640 (1997).

Yoshitaka, et al., "A Survey on Content-Based Retrieval for Multimedia Databases", IEEE Transactions on Knowledge and Data Engineering, vol. 11, No. 1, Jan./Feb. 1999, pp. 81-93.

* cited by examiner

A MULTI-VIEW SHAPE DESCRIPTION OF A CAR WITH ADDED VISIBILITY FLAGS.

USING THE VISIBLE VIEWS FLAG THE SEARCH RETURNS ONLY THE REQUIRED SIDE VIEWS.

METHOD AND APPARATUS FOR REPRESENTING AND SEARCHING FOR AN OBJECT IN AN IMAGE

This application is a Divisional of U.S. application Ser. No. 12/062,377 filed Apr. 3, 2008, which is a Divisional of U.S. application Ser. No. 11/777,135 filed Jul. 12, 2007, which is a Divisional of Prior application Ser. No. 10/220,636 filed Dec. 30, 2002, which is a national phase under 35 U.S.C. §371 of PCT International Application No. PCT/GB01/03044, which has an International filing date of Jul. 6, 2001, which designated the United States of America.

The present invention relates to a method and apparatus for representing an object in an image, especially for use in searching, for example, in a multimedia database. The invention also relates to a method and apparatus for searching for an object in an image.

It is known to store still or video images, for example in image libraries, using representations of objects appearing in images. The representations are used in searching methods to enable images containing objects of interest to be retrieved, The representations may be based on various features of the objects, including colour, texture and shape.

Various methods for representing shapes of objects in images are known. Known methods include chain coding, the quad-tree method and the curvature scale space representation method.

To perform a search in a image searching system, a user inputs a query by presenting the system with a sketch or image of the object sought, or by selecting a view of an object stored on the system. The system then derives or obtains a representation of the query object and compares the query representation with the representations of images stored in the database using an appropriate matching method, The closest matches are displayed on a display unit.

In most cases, an object as it appears in a video image is a projection of a 3-dimensional real object onto a 2-dimensional image plane. The 2-dimensional shape or outline of an object, and the colours and texture of the visible object surface, appearing in an image thus depend on factors such as the viewing position, viewing angle and camera and optical system parameters. Objects will therefore have different features such as outline, shape, colour, texture etc associated with different views.

Our co-pending patent application, PCT/GBOO/01662, the contents of which are incorporated herein by reference, discloses a method and apparatus for representing an object appearing in an image where representations of an object in a plurality of different 2-dimensional views are derived and associated to form an object representation. Preferably, the representations are of the shape of the object, but they may, for example, be of colour or texture in different views.

When applying the above-mentioned method to an object within a still image or a movie etc., there will be several shape or other descriptors associated with an image to represent the object features associated with different views. However, typically any one of these views will be visible within the original image. Some of the features may be associated with the non-visible parts of the object and are only for describing the 3D properties of the object.

If one cannot determine which of the multiple views of the object are visible and which are not, the search method will not be able to find exactly specified views, For example, a search for an image depicting a car, using a side view, will also find top and front views of cars.

The inventive idea is to use visibility flags which state which descriptors actually relate to visible features within the image or movie to which the descriptors are linked.

Accordingly, the present invention provides a method of representing an object appearing in an image, the method comprising deriving a plurality of view descriptors of the object, each view descriptor corresponding to a different view of the object, and indicating when a view corresponds to a view of the object appearing in the image.

In the invention disclosed in. PCT/IGB00/101662 shape descriptors are associated with objects present within a piece of multi-media content. Such descriptors described the shape of the object from different views. These views can be either visible within the multi-media material or not. The visibility flag will store this visibility information.

When the visibility data for each view is available the search method is able to filter out the objects with non-visible views when required.

An embodiment of the invention will be described with reference to the accompanying drawings of which:

Figure 1:
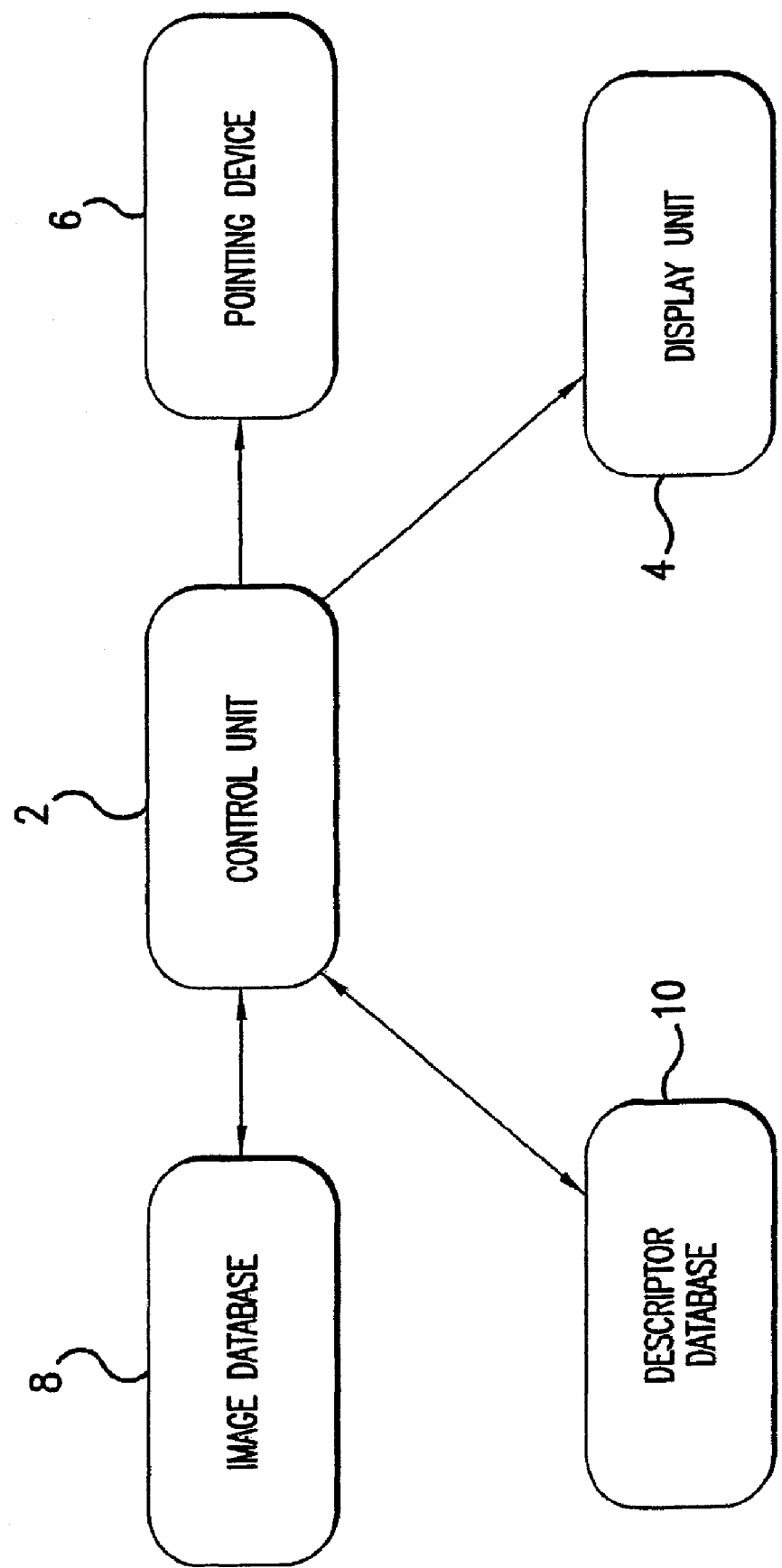
FIG. 1 is a block diagram of a system according to an embodiment of the invention.

A system according to an embodiment of the invention is shown in FIG. 1. The system includes a control unit 2 such as a computer for controlling operation of the system, a display unit 4 such as a monitor, connected to the control unit 2, for displaying outputs including images and text, and a pointing device 6 such as a mouse for inputting instructions to the control unit 2. The system also includes an image database 8 storing digital versions of a plurality of still images and groups of images in the form of video sequences and a descriptor database 10 storing descriptor information, described in more detail below, for objects appearing in each of the still images and video sequences stored in the image database 8. Each of the image database 8 and the descriptor database is connected to the control unit 2.

In this embodiment, the elements of the system are provided on a single site, such as an image library, where the components of the system are permanently linked.

A method of deriving a descriptor for an object according to an embodiment of the invention will be described below. The method will be described first for an object having a relatively simple shape, in this case a cylindrical object.

Figure 2:
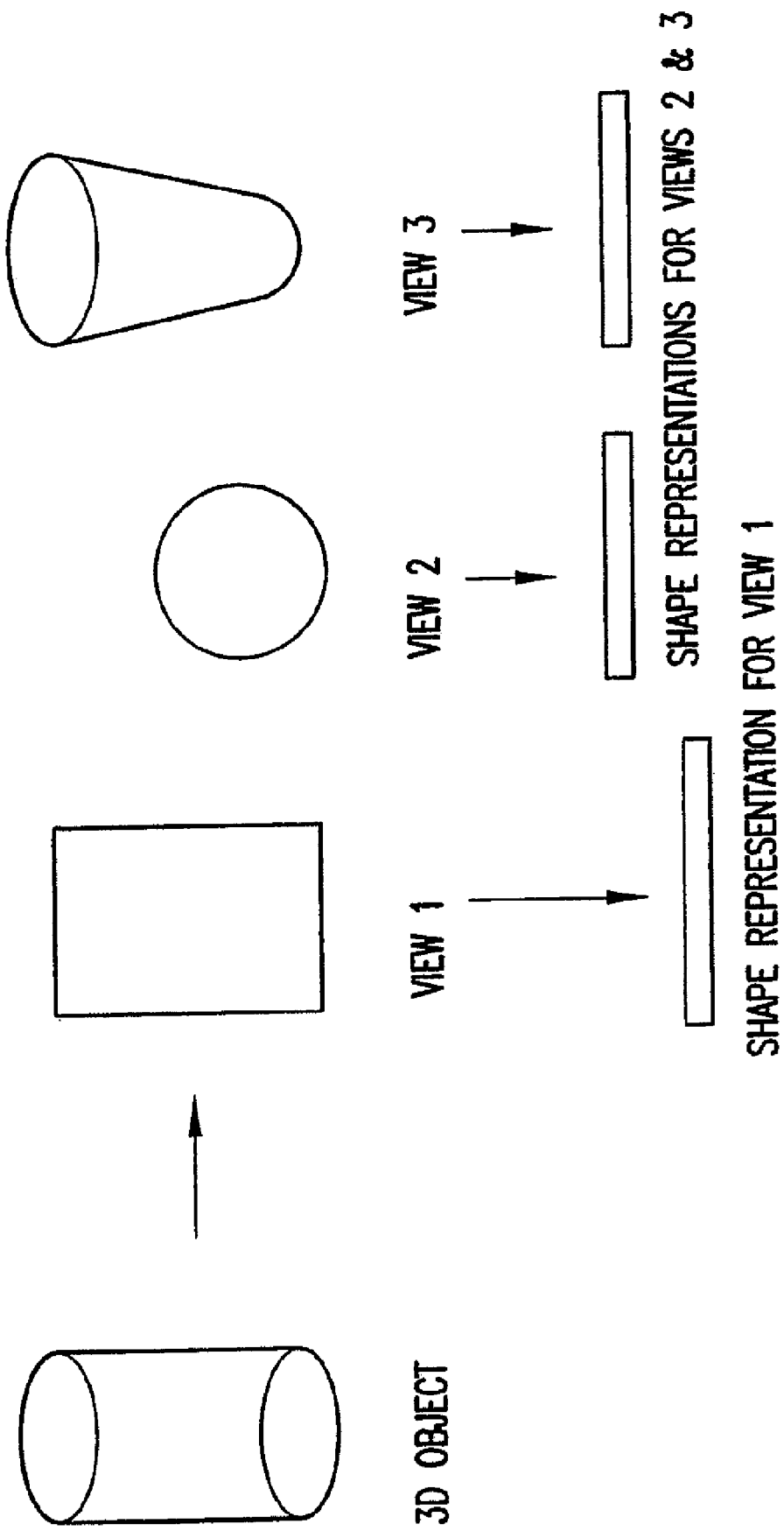
FIG. 2 is a diagram illustrating representation of an object in a video sequence.

In this example, in a video sequence stored in the image database 8, the cylindrical object appears twice. Referring to FIG. 2, in the first appearance, the object outline corresponds to view 1, that is a view from the side and in the second appearance, the object outline corresponds to view 3, that is a perspective view from the side and above.

The database indexer recognises that the two outlines are of the same object and that the 3-dimensional object corresponding to those outlines is a cylinder. For each of view I and view 3, shape descriptors using the curvature scale space (CSS) representation are derived. Also, the database indexer selects any additional views that are deemed representative of the object, even if they do not appear in the video sequence under consideration. In this example, view 2, which is a view of a cylinder from above, is selected as representative. A CSS representation of that view is also obtained.

The paper "Robust and Efficient Shape Indexing through Curvature Scale Space" by Farzin Mokhtarian, Sadegh Abbassi and Josef Kittler, Proc. British Machine Vision Conference, pp. 53-62, Edinburgh, UK 1996 describes a method of curvature scale space representation and is incorporated herein by reference. Briefly, a curve representing the outline of a shape is evolved by smoothing the curve. The curve is considered at a number of different stages in the evolution. More specifically, the curvature zero crossings are identified in a curvature function at each of the stages of the evolution. A graph of the curvature zero crossings is obtained by combining zero crossing from all stages of the evolution. One axis of the graph corresponds to σ a which represents the evolution parameter of the curve and the other axis corresponds to a curve arc length parameter u. A shape is then represented by the locations of the maxima of the contours in the graph.

For each view, a view descriptor is formed, including the appropriate CSS representation. The view descriptor may include other information, such as a global parameter, as described in PCT/GBO0/01662, or colour/texture properties of the corresponding visible surfaces.

The view shape descriptors are combined to form a 3D object shape descriptor. In addition, visibility flags indicating whether or not a given view is visible in at least one frame in the video sequence are associated with the object descriptor. In this example, the visibility flag forms part of each view descriptor. Thus, here the view descriptor of each of view 1 and view 3 includes a visibility flag '1' indicating that the view is visible in a frame of the video, and the view descriptor of view 2 has a visibility flag '0', indicating that the view is not visible in any frame.

3D object shape descriptors are obtained in the above manner for all objects of interest appearing in images or groups of images in the image database 8.

Figure 3:
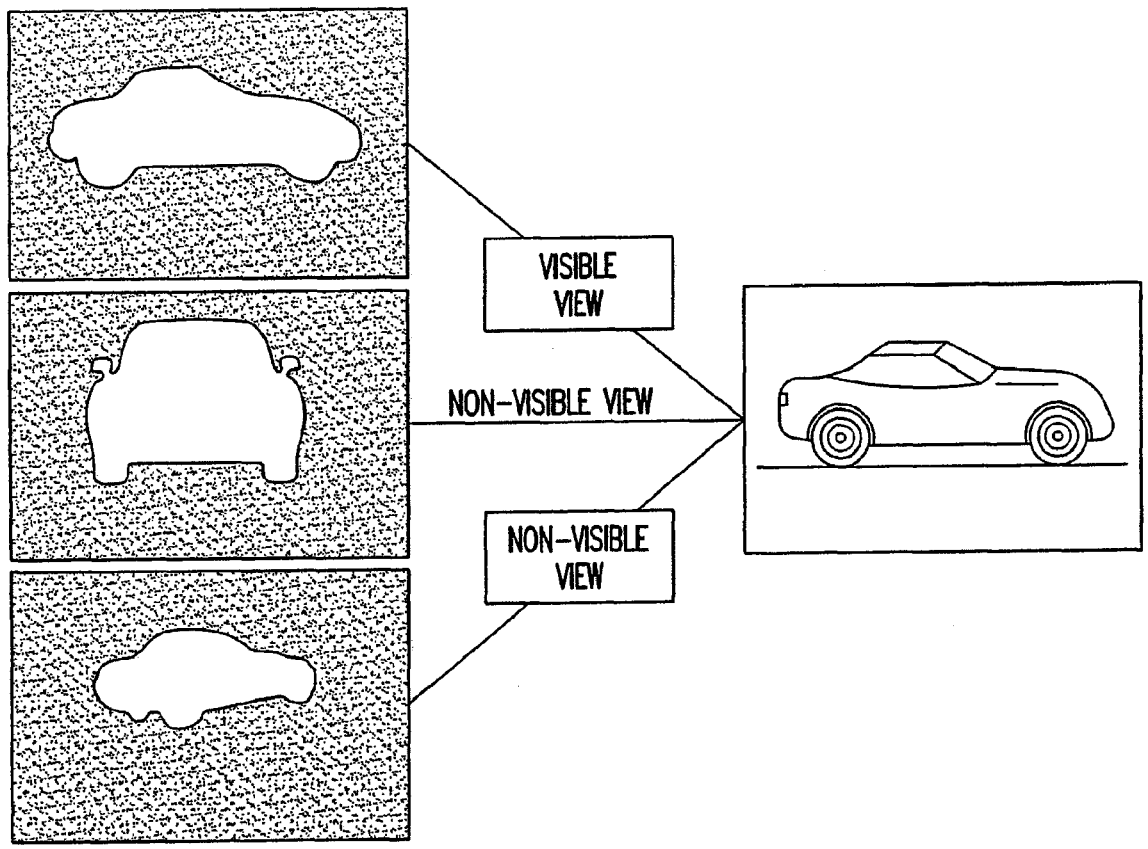
FIG. 3 is a diagram illustrating representation of an object in a still image.

As another example, referring to FIG. 3, three views are derived for a car appearing in a photograph. Corresponding view descriptors, including a CSS representation, are obtained as described above for the car outline in each view. The first view corresponds to the view in the photograph and thus the associated view descriptor has visibility flag '1', indicating a visible view. The view descriptors for the other two views have visibility flags '0', indicating that they correspond to views which are not shown in the photograph. In this example, the visibility flags are determined when extracting the outlines from the photograph. In other words, if a shape is extracted directly from the photograph, then it is given a visibility flag of '1', but if the shape is chosen by the indexer, then it has a visibility flag of '0'. Alternatively, the visibility flags can be added later manually by inspection.

Each view descriptor also has a reference pointer indicating in which image or which frame in which video sequence it appears, and also which object in the image or frame it is, for example, a view of an object may have a pointer indicating that it appears in frame 1000 of video 181 and it is object number 3.

The descriptor database 10 stores the 3D object shape descriptors for the objects in images and video sequences stored in the image database 8.

In the embodiment described above, for an object appearing in a video sequence, one set of view descriptors are derived for the entire sequence, and the view descriptors are used to indicate whether or not the associated view appears in at least one frame of the sequence. In an alternative embodiment, each frame is treated separately. In more detail, a set of view descriptors are derived for an object appearing in the frame, and the visibility flags indicate whether or not the associated view appears in that frame, irrespective or whether or not it appears in another frame of the sequence. In another alternative embodiment, one set of view descriptors are derived for an object appearing in the video sequence, and a set of corresponding visibility flags are derived and stored for each frame.

The visibility flags are used in a method of searching for an object in an image, as described below.

The user initiates a search by inputting a query. The query is input by using the pointing device 6 to draw one or more shape outlines on the display unit 4. The control unit 2 then derives the CSS view descriptor for the query view. Alternatively, the user may input a query by selecting a query shape or shapes from a menu of shapes displayed on the display unit 4 by the control unit 2. In such a case, the view descriptors may already be available in the descriptor database 10. The user also indicates, by checking a box, whether or not the search should be limited to views which are the same as the query view. If the search is not so limited, then a search and matching procedure is performed essentially as described in PCTIGB00/01662, by determining the similarity between the query object descriptor and the object descriptors stored in the descriptor database 10, hereinafter described as model object descriptors.

Briefly, each query view descriptor is compared with each model view descriptor for the model object descriptor under consideration in a comparator using a matching function to derive view-similarity measures. A comparison of an ith query view descriptor and the jth model view descriptor results in a view similarity measure $S_{i,j}$. When there is more than one query view, the median of the view similarity measures is taken as an object similarity measure.

The matching procedure results in n similarity measures S, where n is the number of 3D object descriptors in the descriptor database. The n similarity measures are then ordered starting from the lowest value which indicates the closest match. Them lowest values, where m is a value selected by the user or determined by the set-up of the control unit, are then selected, and the corresponding m images, (some of which may be an image from a video sequence) including the object is displayed on the display unit 4.

If the search is limited to views which are the same as the query view, then non-visible model views are filtered out during the searching process. This can be done by matching the query view descriptor using the matching function only with the model view descriptors which indicate that the corresponding view is visible in an image. In other words, when calculating the similarity measure using the matching function, model view descriptors having visibility flag '0' are omitted, Alternatively, view similarity measures may be calculated for all model view descriptors, but results for model view descriptors for which the visibility flag is zero are then omitted from further processing. Alternatively, the visibility flag can be considered when selecting the search results for display. When displaying the results of the matching procedure, in the case of a video sequence, the frame containing the matched view is displayed.

Figure 4:
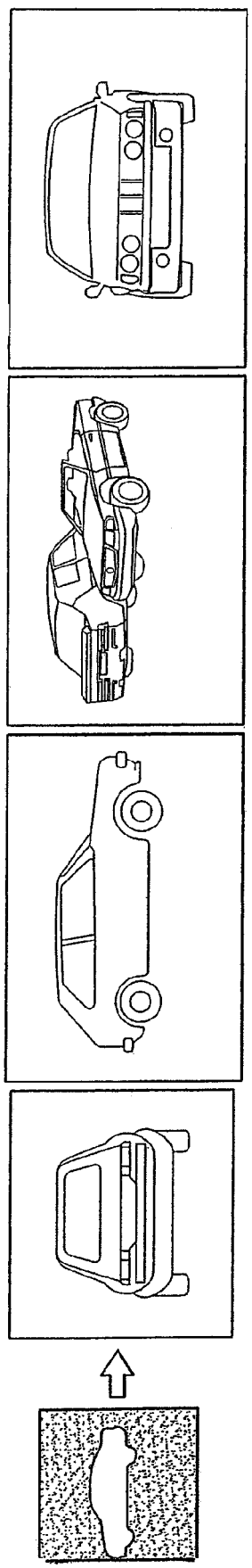
FIG. 4 is a diagram illustrating results of a first search method.
Figure 5:
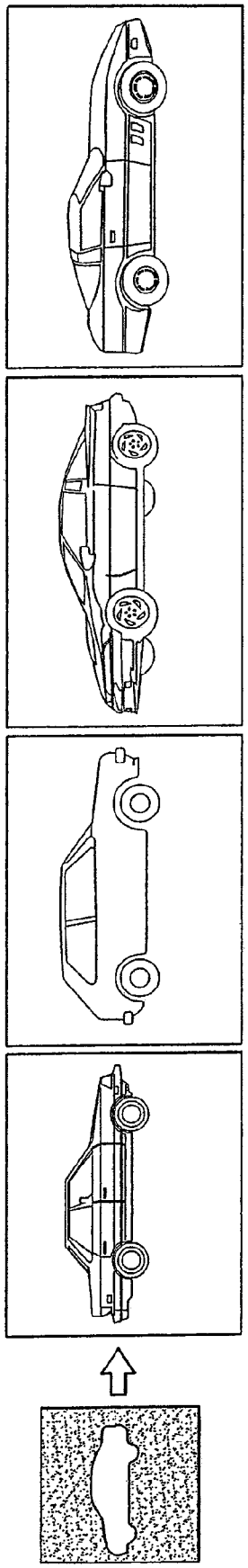
FIG. 5 is a diagram illustrating results of a second search method.

FIG. 4 shows an example of how the multiple views searching method disclosed in PCT/GS00/01662 finds and returns results which are of the same shape but are not of the same view as the query item. FIG. 5 on the other hand shows how the visibility flag within each of the view descriptors can help return results which are of the same shape and the same view as the query item.

A system according to the invention may, for example, be provided in an image library. Alternatively, the databases may be sited remote from the control unit of the system, connected to the control unit by a temporary link such as a telephone line or by a network such as the Internet. The image and descriptor databases may be provided, for example, in permanent storage or on portable data storage media such as CD-ROMs or DVDs.

Components of the system as described such as the selectors and comparators may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The various views of an object making up the complete or quasi-complete shape description may, for example, be provided by the film producer. For example, in a film including a car, the producer may arrange for 20 different views of the car to be shot for use in indexing the film in the database. Alternatively, a link may be provided between all the different views of an object in a sequence to enable the views to be found, and the shape for any useful views not appearing in the sequence may, for example, be provided when data for the first view of the object is included.

The invention can also be used, for example, for matching images of objects for verification purposes, or for filtering.

The invention is applicable to single images, and images in a sequence of images, such as images from a film or a video, or a collection of images that are associated in some way, such as being on the same web page.

In the embodiments described above, view descriptors are derived from the shape of the object in different views. The view descriptors can be derived from other features of the object, such as the colour or texture, either instead of or as well as from shape. Various features of the object, such as shape, colour, texture, can form the basis of the view descriptors alone or in combination, and view descriptors can be based on different features for different views.

The invention claimed is:

1. A method of indexing images or groups of images stored in a database for searching purposes, the method comprising identifying an object appearing in an image or group of images, deriving representations of a plurality of different views of the object, and indicating when a represented view corresponds to the view of the object as it appears in an image, wherein at least one view descriptor comprises a representation of the texture of the object in the respective view, wherein each view is a view of the object from a respective angle of view, the plurality of view descriptors including at least one descriptor of the view of the object in the image and at least one descriptor of a view of the object from an angle of view different from the angle of view of the object in the image.

* * * * *